United States Patent [19]

Kuse et al.

[11] Patent Number: 4,774,147
[45] Date of Patent: Sep. 27, 1988

[54] MAGNETIC RECORDING MEDIUM

[75] Inventors: Sadamu Kuse, Osaka; Seigi Kawarai, Hyogo, both of Japan

[73] Assignee: Hitachi Maxell, Ltd., Osaka, Japan

[21] Appl. No.: 744,970

[22] Filed: Jun. 17, 1985

[30] Foreign Application Priority Data

Jun. 15, 1984 [JP] Japan .................................. 59-124330

[51] Int. Cl.⁴ ............................................... G11B 5/70
[52] U.S. Cl. .................................... 428/323; 427/128; 428/402; 428/403; 428/408; 428/694; 428/900
[58] Field of Search ............... 428/323, 408, 402, 403, 428/694, 900; 427/128

[56] References Cited

U.S. PATENT DOCUMENTS

| | | | |
|---|---|---|---|
| 4,132,827 | 1/1979 | Mukaida et al. | 428/329 |
| 4,135,016 | 1/1979 | Ogawa et al. | 428/900 |

FOREIGN PATENT DOCUMENTS 56-51027  5/1981  Japan .................................. 428/694

*Primary Examiner*—Paul J. Thibodeau
*Attorney, Agent, or Firm*—Birch, Stewart, Kolasch & Birch

[57] ABSTRACT

A magnetic recording medium having an excellent electromagnetic property with low frictional magnetic layer surface which comprises a base material having a magnetic layer provided thereon, said magnetic layer comprising magnetic powder, a resinous binder and graphitized carbon black powder, and optionally, with non-graphitized carbon black powder.

10 Claims, 1 Drawing Sheet

FIG. I
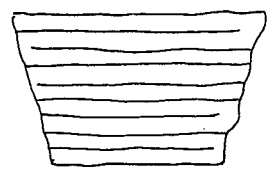
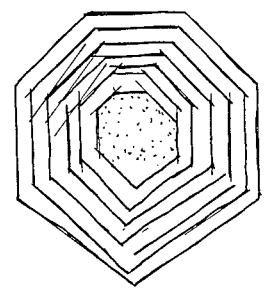
FIG. 2

MAGNETIC RECORDING MEDIUM

The present invention relates to a magnetic recording medium having excellent electromagnetic characteristics with a low frictional magnetic layer surface.

In order to enhance the slipperiness of a magnetic recording medium such as a video tape, a lubricant is usually incorporated into the magnetic layer of such recording medium so as to reduce the friction at the surface of the magnetic layer. As the lubricant for this purpose, a liquid or semi-solid lubricant such as a fatty acid (e.g. stearic acid, myristic acid) or a fatty acid ester is used. However, the use of such a liquid or semi-solid lubricant often results in the surface of the magnetic layer being tacky and the magnetic head of a magnetic recording and re-producing device become stained. A solid lubricant such as graphite powder or molybdenum disulfide powder is also used. The use of a solid lubricant does not produce the drawbacks as seen in the use of the solid or semi-solid lubricant. However, since such solid lubricant is manufactured through the step of crushing, each particle of the lubricant can exert its individual lubricating property based on the layered structure in only one direction (cf. FIG. 1 of the accompanying drawings, which shows the schematic sectional view of the particle of the graphite powder prepared through the step of crushing). For this reason, it is necessary to use the solid lubricant which comprises very fine particles in a greater proportion for attaining satisfactory reduction in friction. Production of such solid lubricant is, as a practical matter, very difficult, and therefore a good lubricity can not readily be achieved by the use of the solid lubricant. Although the incorporation of the solid lubricant in a larger amount may produce a better lubricity, this results in a depression of the electromagnetic characteristics of the magnetic layer.

For the purpose of providing a magnetic recording medium having excellent electromagnetic characteristics with a low frictional magnetic layer surface, an extensive study has been made. As a result, it has been found that the incorporation of carbon black powder of which each particle is covered by a graphite layer at the surface (hereinafter referred to as "graphitized carbon black powder") into the magnetic layer, can impart a satisfactory lubricity thereto without causing any drawback as above stated, with respect to conventional liquid or semi-solid lubricants, as well as conventional solid lubricants.

Quite advantageously, the graphitized carbon black powder can be produced from carbon black powder without any crushing step, and its particle size and distrubition can be readily controlled by appropriate regulation of the atmosphere during production. Since the graphitized carbon black powder of very fine particle size is readily obtainable, a magnetic layer having an extremely smooth surface can be easily formed for its use. While such smooth surface is expected to result in an increase of friction, the lubricity inherent to the graphitized surface is sufficient to overcome the tackiness due to the increased friction. Thus, the magnetic layer incorporated with the graphited carbon black powder is provided with satisfactory smoothness and lubricity. Further, such satisfactory smoothness and lubricity can be achieved by the use of a relatively small amount of the graphitized carbon black powder so that any material deterioration in electromagnetic characteristics, such as sensitivity, is not produced.

According to the present invention, there is provided a magnetic recording medium which comprises a base material having a magnetic layer provided thereon, said magnetic layer comprising magnetic powder, a resinous binder and graphitized carbon black powder.

The magnetic recording medium of the invention comprises a base material having a magnetic layer provided on at least one surface of the base material.

The base material is usually made of a plastic material, such as a polyester (e.g. polyethylene terephthalate), in a film, tape or sheet form.

BRIEF DESCRIPTION OF THE DRAWINGS

FIG. 1 shows a sectional view of a particle of graphite powder.

FIG. 2 shows a section view of graphitized carbon black powder.

The magnetic layer comprises magnetic powder, a resinous binder and graphitized carbon black powder. As the magnetic powder, there may be used gamma-$Fe_2O_3$ powder or intermediary oxides thereto, $Fe_3O_4$ powder or intermediary oxides thereto, Co-containing gamma-$Fe_2O_3$ powder or intermediary oxides thereto, $CrO_2$ powder, Fe powder, Co powder, Fe-Ni powder, Fe-Co-Ni powder, barium-ferrite powder, etc. These magnetic powders usually have an average particle size (longer) of about 0.05 to $1\mu$. Examples of the resinous binder are polyvinyl chloride, vinyl chloride/vinyl acetate copolymer, polybutyral resin, polyacetal resin, polyurethane resin, polyester resin, acrylic resin, rubbery resin, cellulose resin, isocyanate compounds, etc.

The graphitized carbon black powder incorporated in the magnetic layer according to the present invention comprises particles in which each is an integral body of a core portion and a graphitized surface layer around the core portion (cf. FIG. 2 of the accompanying drawings, which shows the schematic sectional view of the particle of the graphitized carbon black powder) and can be produced by subjecting carbon black powder to heat treatment at high temperatures such as temperatures of from 2,700° to 3,000° C. As the starting carbon black powder, there may be used fine particles of carbon obtained by partial combustion or thermal decomposition of hydrocarbons such as natural gas or petroleum. Each particle of the carbon black powder is an aggregate of crystallites wherein several carbonaceous layer planes are stacked one on top of each other, almost in parallel with intervals of about 3.5 Å, said carbonaceous layer planes being each consisting of about 90 carbon atoms arranged in hexagonal rings. The microstructure of each particle may be considered to comprise a core portion wherein crystallites are arranged irregularly and a surface portion wherein crystallites are arranged in parallel or almost parallel to the surface. The angular displacement of one layer with respect to another is random and the layers overlap one another irregularly, this being termed a turbostratic structure.

Heat treatment of the starting carbon black powder at said temperature results in a decrease of the distance between the carbonaceous layer planes and growth of the crystallites, whereby the arrangement of carbonaceous layer planes at the surface of each particle changes to make a shell-like graphitized structure. Thus, each particle of the graphitized carbon black powder has a concentric graphite layer structure similar to the crystalline structure of a graphite particle at the surface and therefore can exert the lubricity in every directions. Accordingly, its incorporation into the magnetic layer produces a significant reduction in friction.

In Japanese Patent Publn. (unexamined) No. 88307/1977, it is described that a graphite-like crystalline structure is partly observed in carbon black powder having a surface area of more than 700 $m^2/g$ and a DBP oil absorption of more than 300 ml/100 g. However, the graphite-like crystalline structure as described therein merely means such a crystalline structure that at the surface of the particle of carbon black powder, crystallites are arranged in parallel to said surface with good orientation. Thus, the size of the crystallite in the carbon black powder of said literature is equal to that of in usual carbon black powder. In the graphitized carbon black powder to be used in this invention, the crystallites are, as stated above, decreased in the distance between the carbonaceous layer planes and are grown so as to cover the entire surface of each particle.

The grahitized carbon black powder is desired to have an average particle size of about 20 to 200 m$\mu$, preferably of about 50 to 100 m$\mu$. Further, each particle of the graphitized carbon black is preferred to have a graphitized layer of 5 to 50% in thickness of the particle size. When the particle size is too small, the effect of reducing the friction is not sufficient. When too large, the surface of the magnetic layer is made rough, and its smoothness is lowered.

For preparation of said desirable graphitized carbon black powder, there may be used as the starting material carbon black powder having an average particle size of about 25 to 220 m$\mu$ with a suitable specific surface area and an appropriate DBP (dibutylphthalate) oil absorption. In a case of the average particle size being about 20 m$\mu$, for instance, there may be used the one having a specific surface area of not more than 150 $m^2/g$ (determined by the nitrogen absorption method (hereinafter referred to as "BET method") and a DBP oil absorption of not more than 130 ml/100 g. In a case of the average particle size being about 50 m$\mu$, the one having a specific surface area of not more than 70 $m^2/g$ (determined by the BET method) and a DBP oil absortion of not more than 100 ml/100 g may be used. In a case of the average particle size being about 100 m$\mu$ or more, the one having a specific surface area of not more than 30 $m^2/g$ (determined by the BET method) and a DBP oil absortion of not more than 70 ml/100 g may be employed.

Specific examples of the graphitized carbon black powder which are commercially available are Nos. 4010 and 4040 (manufactured by Mitsubishi Chemical Industries Ltd.), Spheron 6, Stering R and Stering FT (manufactured by Cabot Corporation), etc.

The amount of the graphitized carbon black in the magnetic layer may usually be from about 0.05 to 5 parts by weight, preferably from about 0.1 to 2 parts by weight to 100 parts by weight of the magnetic powder. When the amount is smaller than said lower limit, the friction is not sufficiently reduced. When larger than said upper limit, the magnetic powder content in the magnetic layer is decreased so that the sensitivity may be lowered.

In addition to the above essential components, the magnetic layer may comprise optionally a fatty acid (e.g. stearic acid, myristic acid) or a fatty acid ester. Its amount is to be the one which neither makes the resulting magnetic layer tacky nor the one which stains the magnetic head and may usually be from about 0.5 to 5 parts by weight to 100 parts by weight of the magnetic powder.

The magnetic layer may also optionally comprise carbon black powder, i.e. non-graphitized carbon black powder. Among various kinds, carbon black powder having a dispersibility-enhancing activity, i.e. dispersion-assisting carbon black powder) is preferably used. Examples of the dispersing carbon black powder as commercially available are "Black Pearles L" (manufactured by Cabot Corporation), "Raven 1255" (manufactured by Columbian Carbon Co., Ltd.), "MA7" (manufactured by Mitsubishi Chemical Industries Ltd.), etc. The carbon black powder usually has an average particle size of about 20 to 100 m$\mu$ and especially of not more than the average particle size of the graphitized carbon black powder. Its DBP oil absorption is ordinarily not more than about 100 ml/g, particularly not more than about 50 ml/g, and its content of volatile components is not less than about 3% by weight.

Usually, carbon black powder has functional groups or structures such as carboxyl, quinone, phenol and lactone at the surfaces of the particles. As a result of heat treatment, however, those groups or structures are substantially lost so that said graphitized carbon black powder devoid of any such groups or structures. When the dispersion-assisting carbon black powder is incorporated, its particles surround each particle of the graphitized carbon black powder so as to simulate a state of the particles of the graphitized carbon black powder having said functional groups or structures at the surface accordingly, the dispersibility of the graphitized carbon black powder is enhanced.

When the dispersion-assisting carbon black powder is too small in an average particle size, their own dispersibility is deteriorated. When the average particle size is too much larger than that of the graphitized carbon black powder, the particles of the graphitized carbon black powder are not sufficiently surrounded by those of the dispersion-assisting carbon black powder. Thus the dispersibility of the graphitized carbon black powder is not improved. In case of the DBP oil absorption being too large, the dispersion-assisting carbon balck powder is agglomerated. Thus, the particle size is practically and substantially increased, and the graphitized carbon black power is not sufficiently surrounded by the dispersion-assisting carbon black powder. As a result dispersibility of the graphitized carbon black powder is not improved. In case of the DBP oil absorption being too small, the dispersion-enhancing effect is insufficient.

For favorable improvement of the dispersibility with the dispersion-assisting carbon black powder, there may be used an amount of about 60 to 200% by weight based on the weight of the graphitized carbon black powder. When its amount is too small, a sufficient dispersing effect is hardly obtainable. When its amount is too large, the proportion of the magentic powder in the magnetic layer becomes smaller so that the electromagnetic characteristics of the magnetic layer are lowered.

Preparation of the magnetic recording medium of the present invention may be carried out by a conventional procedure. For instance, the essential and optional components of the present invention, with any other additive, if desired, may be dispersed or dissolved uniformly in a mixing apparatus (e.g. ball mill) to make an appropriate liquid medium (e.g. cyclohexanone, toluene, methylisobutylketone). The resulting magnetic coating composition is applied onto a base material with the aid of a conventional applicator (e.g. roll coater), followed by drying to make a magnetic layer.

Practical and preferred embodiments of the invention are illustratively shown in the following Examples wherein part(s) and % are by weight unless otherwise indicated:

EXAMPLE 1

| Materials | Part(s) |
| --- | --- |
| Co—containing gamma-Fe$_2$O$_3$ powder | 100 |
| alpha-Fe$_2$O$_3$ powder | 5 |
| Graphitized carbon black powder ("No. 4010" manufactured by Mitsubishi Chemical Industries Ltd.; average particle size, 80 m$\mu$) | 1 |
| Antistatic cationic surfactant ("Elegan FD" manufactured by Nippon Oil and Fats Co.) | 0.5 |
| Stearic acid | 2 |
| Vinyl chloride/vinyl acetate copolymer ("VAGH" manufactured by Union Carbide Corporation) | 15 |
| Polyurethane resin ("T-5201" manufactured by Dainippon Ink Co., Ltd.) | 10 |
| Organic solvent (a mixture of cyclohexanone, methylethylketone and toluene = 1:1:1) | 160 |

The above materials were mixed together and dispersed in a ball mill for 50 hours, and an isocyanate compound ("Desmodule L" manufactured by Bayer AG) (5 parts) was added thereto. The resultant mixture was stirred for 1 hour to give a magnetic coating composition.

The magnetic coating composition was applied onto the surface of a polyethylene terephthalate film of 15$\mu$ in thickness, followed by drying to make a magnetic layer of about 5$\mu$ in thickness. After calendering treatment, the resultant film was cut in a ½ inch width to give a magnetic recording tape.

EXAMPLE 2

In the same manner as in Example 1 but incorporating dispersion-assisting carbon black powder ("Pearles L" manufactured by Cabot Corporation; average particle size, 24 m$\mu$; DBP oil adsorption, 60 ml/100 g; volatile content, 5%) (0.7 part) into the magnetic coating composition and changing the amount of the organic solvent to 170 parts, there was prepared a magnetic recording tape.

EXAMPLE 3

In the same manner as in Example 1 but changing the amount of graphitized carbon black powder to 3 parts, there was prepared a magnetic recording tape.

Comparative Example 1

In the same manner as in Example 1 but not using graphitized carbon black powder and changing the amount of stearic acid to 8 parts, there was prepared a magnetic recording tape.

Comparative Example 2

In the same manner as in Example 1 but using graphite powder ("CSSP" manufactured by Nippon Graphite Co.; average particle size, 1,000 m$\mu$) (1 part) instead of graphitized carbon black powder, there was prepared a magnetic recording tape.

Comparative Example 3

In the same manner as in Examle 1 but using carbon black powder ("Ketchen Black E.C." manufactured by AKZO N. V.; average particle size, 30 m$\mu$) (1 part) instead of graphitized carbon black powder, there was prepared a magnetic recording tape.

EXAMPLE 4

In the same manner as in Example 1 but using magnetic metallic iron powder (100 parts) instead of Co-containing gamma-Fe$_2$O$_3$ powder and changing the amount of the organic solvent to 250 parts, there was prepared a magnetic recording tape.

EXAMPLE 5

In the same manner as in Example 1 but using magnetic metallic iron powder (100 parts) instead of Co-containing gamma-Fe$_2$O$_3$ powder, changing the amount of the organic solvent to 260 parts and incorporating dispersion-assisting carbon black powder as in Example 2 (0.7 part) into the magnetic coating composition, there was prepared a magnetic recording tape.

Comparative Example 4

In the same manner as in Example 4 but not using graphitized carbon black powder and changing the amount of stearic acid to 8 parts, there was prepared a magnetic recording tape.

With respect to the magnetic recording tapes as prepared in Examples 1 to 5 and Comparative Examples 1 to 4, the friction coefficient, surface smoothness and sensitivity of the magnetic layer as well as the stain on the magnetic head were examined in the following procedures:

Friction coefficient:

A SUS 304 made cylinder having a diameter of 4 mm and a surface roughness of 0.2 S was suspended horizontally, and a magnetic recording tape was vertically hung around the cylinder. While charging a 30 kg load onto one end of the tape, the other end was drawn in a horizontal direction with a speed of 1.4 cm/sec to determine the stress (T), which was introduced into the following formula to obtain the friction coefficient ($\mu$):

$$\mu = 2/\pi \ln(T/30)$$

Surface smoothness:

The average surface roughness (C.L.A. value) of the magnetic layer was measured by the aid of a needle contact roughness meter under the following conditions: needle speed, 0.06 cm/sec; cut-off, 0.08 mm. The resulting C.L.A. value was introduced into the following formula to calculate the relative value, on which the surface smoothness was evaluated:

$$\text{Relative value} = 10 \log \frac{\text{C.L.A value of magnetic recording tape in Example 1}}{\text{C.L.A value of magnetic recording tape in other Example}}$$

Sensitivity:

The output of the magnetic recording tape at 5 MHz was measured when the magnetic recording tape in Example 1 was taken as the standard (0 dB).

Stain on magnetic head:

A signal of 5 MHz was recorded on the magnetic recording tape. The magnetic recording tape was loaded on a tape player, and the time until the reproducing signal level was reduced by 3 dB due to the stain on the head and the produced clogging was measured. No depression in the output level over 120 minutes or more was taken as good (O); depression of the output level in 60 to 120 minutes was taken as not good (Δ); and depression of the output level within 60 minutes was taken as bad (X).

The results are shown in the following table.

TABLE

| | Friction coefficient | Surface smoothness | Sensitivity (dB) | Stain on magnetic head |
|---|---|---|---|---|
| Example | | | | |
| 1 | 0.20 | 0 | 0 | O |
| 2 | 0.20 | +0.2 | +0.3 | O |
| 3 | 0.20 | −0.1 | −0.2 | O |
| Comparative Example | | | | |
| 1 | 0.22 | −0.1 | −0.3 | X |
| 2 | 0.22 | −0.4 | −0.5 | Δ |
| 3 | 0.25 | −0.8 | −1.0 | Δ |
| Example | | | | |
| 4 | 0.23 | +0.2 | +11.5 | O |
| 5 | 0.22 | +0.7 | +12.1 | O |
| Comparative Example | | | | |
| 4 | 0.28 | +0.1 | +10.0 | X |

As understood from the above results, it is clear that the magnetic recording tapes in Examples 1 to 5 (according to the invention) show better sensitivity with smaller friction coefficient without causing any stain on the head in comparison with those in Comparative Examples.

We claim:

1. A magnetic recording medium which comprises a base material having a magnetic layer provided thereon, said magnetic layer comprising magnetic powder, a resinous binder and a graphitized carbon black powder comprising essentially of particles having an average particle size of 20 to 200 mμ and each comprising an integral core portion and a graphitized surface layer around said core portion, the thickness of said graphitized surface layer being from 5 to 50% of the particle size.

2. The magnetic recording medium according to claim 1, wherein the graphitized carbon black powder is contained in the magnetic layer in an amount of 0.05 to 5 parts by weight to 100 parts by weight of the magnetic powder.

3. The magnetic recording medium according to claim 2, wherein the graphitized carbon black powder is contained in the magnetic layer in an amount of 0.1 to 2 parts by weight to 100 parts by weight of the magnetic powder.

4. The magnetic recording medium according to claim 1, wherein the magnetic layer further comprises dispersion-assisting carbon black powder.

5. The magnetic recording medium according to claim 4, wherein the dispersion-assisting carbon black powder has an average particle size of 20 to 100 mμ.

6. The magnetic recording medium according to claim 4, wherein the average particle size of the dispersion-assisting carbon black powder is not larger than the size of the graphitized carbon black powder.

7. The magnetic recording medium according to claim 4, wherein the dispersion-assisting carbon black powder has a DBP oil absorption of not more than 100 ml/100 g.

8. The magnetic recording medium according to claim 7, wherein the dispersion-assisting carbon black powder has a DBP oil absorption of not more than 50 ml/100 g.

9. The magnetic recording medium according to claim 4, wherein the dispersion-assisting carbon black powder has a volatile content of not less than 3% by weight.

10. The magnetic recording medium according to claim 4, wherein the dispersion-assisting carbon black powder is contained in an amount of 60 to 200% by weight based on the weight of the graphitized carbon black powder.

* * * * *